United States Patent [19]

Liguori

[11] 3,914,038
[45] Oct. 21, 1975

[54] METHOD AND APPARATUS FOR PROVIDING A STATIONARY FILM RECORD HAVING SEQUENTIALLY DISPLAYABLE IMAGES

[76] Inventor: Stephen A. Liguori, 100 Ellsworth Terrace, Glen Rock, N.J. 07452

[22] Filed: July 15, 1974

[21] Appl. No.: 488,745

Related U.S. Application Data

[62] Division of Ser. No. 356,970, May 3, 1973, Pat. No. 3,858,974.

[52] U.S. Cl. .................................. 353/89; 353/82
[51] Int. Cl.² .................... G03B 23/00; G03B 21/14
[58] Field of Search ............ 353/82, 25, 89, 88, 91, 353/100, 101; 352/205, 87

[56] References Cited
UNITED STATES PATENTS

| | | | |
|---|---|---|---|
| 3,715,157 | 2/1973 | Worthington | 353/89 |
| 3,768,899 | 10/1973 | La Parra | 353/89 |

*Primary Examiner*—Harry N. Haroian
*Attorney, Agent, or Firm*—Hubbell, Cohen and Stiefel

[57] ABSTRACT

A projection means for stationary film record frame having a plurality of sequentially displayable images contained in the frame area for sequentially displaying a plurality of images may sequentially be displayed from the film record in a stationary position thereof. A plural lens array, with the number of lenses corresponding to the number of displayable images recorded on the frame, is provided, which, in conjunction with a rotatable shutter selectively displays the recorded images in sequential fashion. Means are provided, such as a conical wedge having a predetermined slope, for simultaneously varying the magnification of the plurality of lenses while maintaining the registration of each of the plurality of selectively displayable images with respect to a display surface for the selected single image. Such a stationary film record frame may be produced by a removable attachment for a camera which attachment contains a plural lens array and a controllable rotatable shutter which cooperates with the internal shutter of the camera so as to selectively expose the plurality of lenses one at a time while the camera shutter is open, each of the lenses being associated with a particular image record area on the stationary film record frame upon which the plurality of images is being recorded.

17 Claims, 14 Drawing Figures

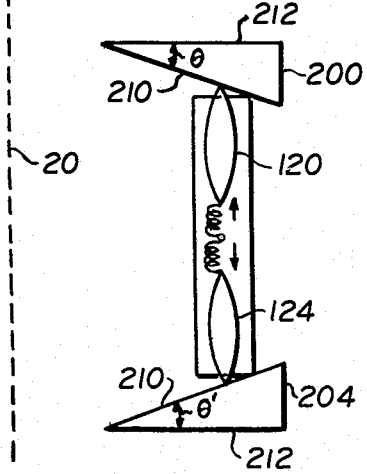
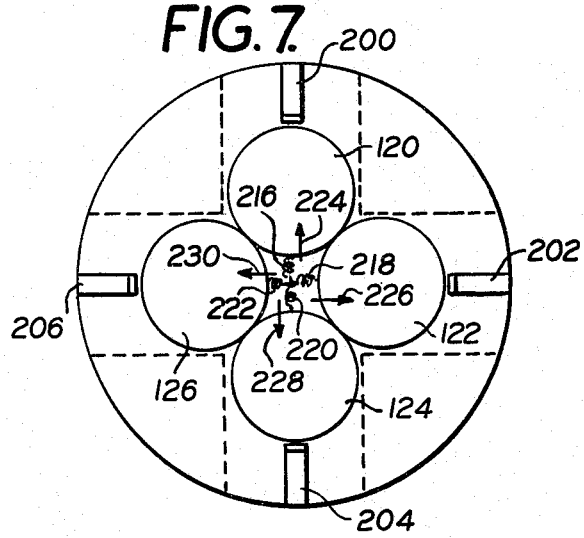
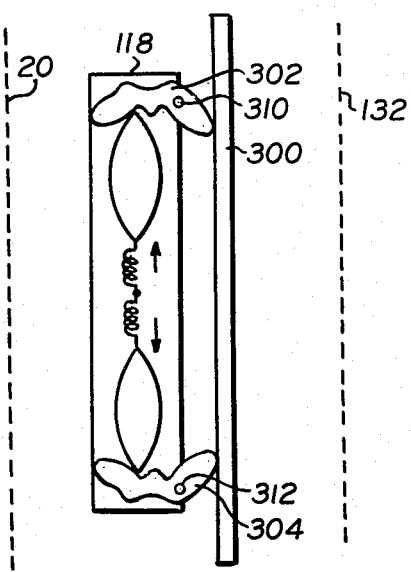
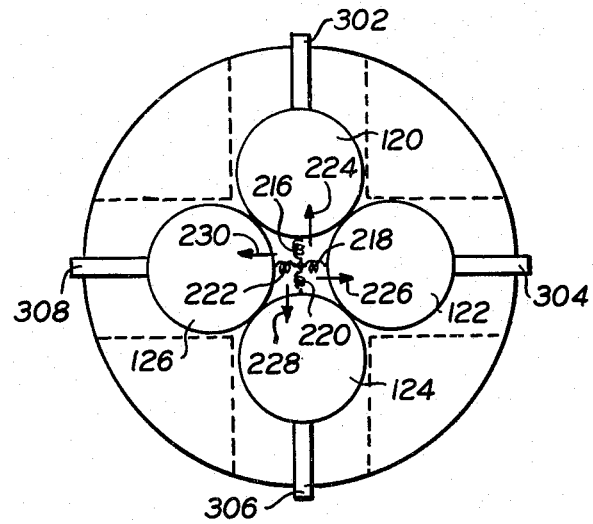
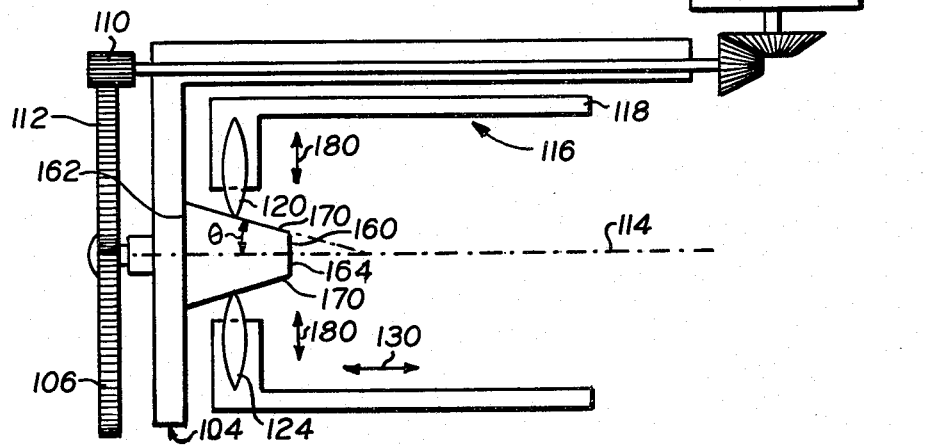

METHOD AND APPARATUS FOR PROVIDING A STATIONARY FILM RECORD HAVING SEQUENTIALLY DISPLAYABLE IMAGES

This a division, of applicliation Ser. No. 356,970, filed May 3, 1973, now U.S. Pat. No. 3,858,974.

BACKGROUND OF THE INVENTION

1. Field of the Invention

The present invention relates to stationary film records and methods and apparatus for providing such a displayable stationary film record; more particularly, to such a stationary film record having sequentially displayable images.

2. Description of the Prior Art

Prior art devices and film records for displaying sequential images have been quite complex and costly. For example, some prior art devices utilize a slide having a plurality of images recorded thereon with each image having a different polarization such as one image being polarized positive and the other displayable image being polarized negative. These images are selectively displayed through a polarizing disc so as to select the positive or negatively polarized image. However, each of the film records is quite costly and the apparatus for displaying the film record is quite complex. An example of such an arrangement is disclosed in U.S. Pat. Nos. 3,561,859 and 3,620,611. Another prior art attempt to provide a meaningful sequential display of images is by the use of a motion picture projector which takes the motion picture image and slows it down to three or four frames per viewing interval. However, such a projector is quite costly. Other prior art attempts to provide sequential images such as by overlays, have utilized a complicated arrangement to provide superimposed images on the screen. Furthermore, these prior art arrangements all require the purchase of a special projection apparatus rather than a modification to an existing projector, such as via a removable attachment, so that the existing projector can be utilized for normal use or the special sequential display of images. Thus, applicant is presently unaware of any satisfactory prior art device for providing a stationary film record frame in which a plurality of images thereon may be sequentially displayed in an efficient and economical manner. These disadvantages of the prior art are overcome by the present invention.

SUMMARY OF THE INVENTION

A method and apparatus for providing a stationary film record having sequentially displayable images is provided. The film record frame has a predetermined displayable frame area and associated optical center for purposes of display. The frame area is divided into a plurality of contiguous image display areas, each containing a distinct separately sequentially displayable image. Each of the image display areas is substantially equal in size and has a different distinct optical center for purposes of display of the image contained therein. The image display area optical centers are equidistant from the frame area optical center and the sequentially displayable images each have substantially the same orientation with respect to each other and the frame area optical center. The plurality of images are sequential with respect to each other and separately sequentially displayable from the film record while the film record is stationary for purposes of display whereby a plurality of images may sequentially be displayed from the film record in a stationary position thereof. For projecting such a stationary film record so as to sequentially display the plurality of sequential images stored on the stationary film record, a projection lens array and a controllable shutter is provided. The projection lens array has a plurality of projection lenses with each of the lenses being associated with a different corresponding image display area. The plurality of lenses is equal in number to the plurality of image display areas with each of the lenses being capable of projecting an image from the associated image display area. The shutter means is interposable between the lens array and the film record and has an aperture therein substantially equal in size to one of the image dispaly areas and is selectively registerable therewith. The shutter is capable of interposing an opaque mask between the lens array and the other image display areas for selectively preventing the display of the image display areas other than the one with which the aperture is selectively registerable. Means are also provided for controllably rotating the shutter means for sequentially selectively varying the image display area with which the aperture is registerable so as to provide the sequential display of the images from the stationary record. The lens array also comprises means for simultaneously varying the magnification of the plurality of lenses and maintaining the registration of each of the plurality of selectively displayable images with respect to a display surface for the selected single image. The lens array has a longitudinal axis with the magnification being varied by movement of the lens array with respect to the stationary film record frame along the longitudinal axis which is substantially normal to the frame area optical center. The magnification varying and registration maintaining means controllably simultaneously translates the lenses in a direction toward or away from the longitudinal axis so as to simultaneously translate the optical axes associated with the lenses to a different predetermined position substantially parallel to the longitudinal axis whereby the registration of each of the selectively displayable images with respect to the display surface is maintained as the magnification is varied by the movement of the lenses along the longitudinal axis. The stationary film record frame may be provided by means of an attachment for a camera, which attachment comprises a plural lens array and an associated controllably rotatable shutter for selectively exposing one of the lenses of the array, the shutter being associated with the internal shutter of a camera so that the plural lenses are selectively exposed while the camera shutter is open. Each of the plural lenses is associated with a particular image record area on the single film record frame of the camera so that a timed exposure will produce a sequential film record on the stationary film record frame. Such a stationary film record frame may also be produced by providing a plurality of recordable images on a mounting surface which is simultaneously photographed by a camera having a single film record frame which is exposed by such a photograph or by providing a movie film containing a plurality of sequentially recorded images which movie film is threaded so as to expose a preselected assortment, such as every tenth frame, of the sequential images to a camera which simultaneously photographs the preselected assortment to provide the stationary film record frame.

BRIEF DESCRIPTION OF DRAWING

FIGS. 6 & 7 are diagrammatic illustrations of an alternative embodiment of a display device for the preferred stationary film record frame of the present invention;

FIGS. 8 & 9 are diagrammatic illustrations of still another alternative embodiment of a display device for use with the preferred stationary film record frame of the present invention;

FIG. 10 is a partial diagrammatic illustration of the display device shown in FIG. 1;

DETAILED DESCRIPTION OF THE PREFERRED EMBODIMENTS

Figure 3:
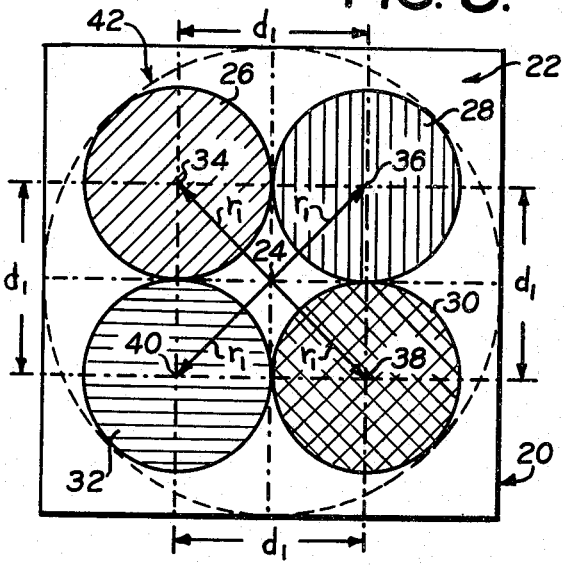
FIGS. 3 & 4 are diagrammatic illustrations of the preferred stationary film record frame of the present invention.
Figure 4:
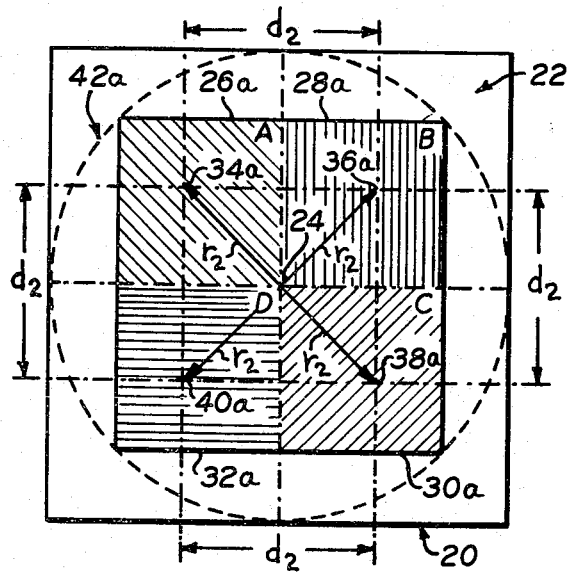

Referring now to the drawings in detail and especially to FIGS. 3 & 4, initially, the preferred stationary film record frame generally referred to by the reference numeral 20 is shown. This film record frame 20 may be a transparency, such as conventional 35 millimeter film utilized for producing slides and displayable with a conventional slide projector or one modified in the manner to be discussed in greater detail hereinafter, or may be an opaque film record frame of the type displayable with a conventional opaque projector, or a single frame of a strip film transparency which is displayable with a conventional strip film projector, or any other desired film record displayable with a conventional projection means therefor capable of being modified in the manner to be discussed in greater detail hereinafter. For purposes of explanation, it shall be assumed that the film record frame is a transparency displayable by a conventional slide projector although, it is of course understood, that the description is equally applicable to any of the other aforementioned types of film records, such as opaque film records.

Initially referring to FIG. 3, the film record frame 20 preferably has a conventional associated predetermined displayable frame area 22, which in the example shown is a rectangular display area. This frame area 22 has an associated optical center 24 for purposes of display. Preferably, as shown in FIG. 3, the frame area 22 is divided into a plurality of contiguous image display areas, four such areas 26, 28, 30 and 32 being shown by way of example. Each of these areas preferably contains a distinct separately displayable image. Furthermore, each of these images contained in areas 26, 28, 30 and 32 is preferably a sequential image with respect to the other contiguous image display areas and, as will be explained in greater detail hereinafter, is preferably separately sequentially displayable. For purposes of explanation, it is assumed that the images are sequentially displayable. For purposes of explanation, it is assumed that the images are sequentially arranged clockwise starting with area 26, then area 28, then area 30 and finally area 32. In addition, each of the images contained in the respective image display areas 26 through 32, inclusive, preferably has the same orientation with respect to each other and with respect to the optical center 24 of the frame area 22. Furthermore, each of the image display areas 26 thorough 32, inclusive, is preferably substantially equal in size and has a different distinct optical center for purposes of display of the image contained therein, these optical centers being respectively indicated by reference numerals 34, 36, 38 and 40. The image display area optical centers 34 through 40, inclusive, are all preferably equidistant from the frame area optical center 24 as indicated by radius $r1$ in FIG. 3. As will be explained in greater detail hereinafter, the plurality of images contained in the image display areas 26 through 32, inclusive, are preferably separately sequentially displayable from the film record 20 while the film record 20 is stationary for purposes of display so that a plurality of images may sequentially be displayed from the film record in a stationary position thereof. The associated optical centers 34 through 40, inclusive, of the respective image display areas 26 through 32, inclusive, are also each preferably equidistant from each adjacent or contiguous image display area as indicated by the symbol $d$, in FIG. 3.

As shown and preferred in FIG. 3, each of the image display areas 26 through 32, inclusive, preferably comprises the maximum size area configuration of equal diametral dimension containable within an area sectional segment of a maximum size circular area containable within the frame area 22. This maximum size circular area is illustratively indicated in FIG. 3 by the dashed line circle 42. In the example shown in FIG. 3, wherein preferably four segments of the frame area 22 are utilized, which is the preferred optimum for light efficiency for the image, although any desired number of segments may be utilized, the greater the number of segments the greater the permissible movement or number of overlays possible, as will be explained in greater detail hereinafter, the preferred configuration of the image display areas 26 through 32, inclusive, is circular. Therefore, the image display area 26 through 32, inclusive, is preferably the maximum size circular area superimposable in the respective quadrant segment of the circle 42, each of the image display areas 26, through 32, inclusive, preferably being equal in diameter.

With respect to FIG. 4, an alternative embodiment of the film record frame 20 of the present invention is shown. Basically, the film record frame 20 is preferably identical with that previously described with reference to FIG. 3 with the exception that the sequential image display areas, indicated by the same reference numerals followed by the letter $a$, are rectangular in configuration as opposed to circular as in FIG. 3. More particularly, these rectangular configurations 26a through 32a, inclusive, are preferably square area configurations. Thus, these image display areas 26a through 32a, inclusive, of FIG. 4 preferably comprise the maximum size square area containable within the quadrant of the circular area 42a, each of the square areas 26a through 32a, inclusive, preferably being equal in diametral dimension. Similarly, the associated optical centers 34a through 40a, inclusive, of the respective image display areas 26a through 32a, inclusive, are each preferably equidistant from the optical center 24 of the frame area 22 as indicated by the symbol r2, as well as preferably being equidistant from the adjacent or contiguous image display area optical center as indicated by the notation d2 in FIG. 4. As was previously mentioned with respect to FIG. 3, preferably the images contained in the image display areas 26a through 32a, inclusive, each have the same orientation with respect to each other and with respect to the frame area optical center 24.

Figure 11:
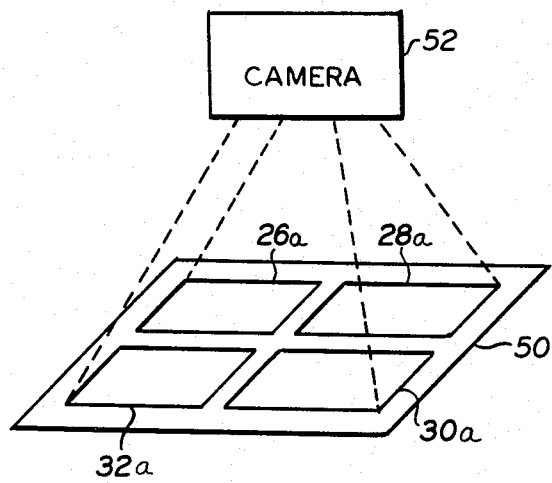
FIG. 11 is a diagrammatic illustration of the preferred method of providing a stationary film record frame of the present invention.

Referring now to FIGS. 11, 12, 13 and 14, various methods for producing the stationary film record frame 20 of FIGS. 3 and 4 shall be described, with the method illustrated in FIG. 11 being the presently preferred method. Referring now to FIG. 11, in order to produce the stationary film record of FIG. 3 or 4, preferably the desired number of images, four being shown by way of example, are arranged on a mounting surface 50, such as a display board, in the desired sequential fashion which, in the example shown, is clockwise. These images are preferably located so as to be within the field of view of the lens of a conventional camera 52 for producing the desired film record. In the example shown, it shall be assumed that the desired film record is a slide transparency and the associated camera is a conventional 35 millimeter slide camera. Most preferably, the images 26a through 32a are arranged so that they are arrayed on the mounting means 50 within the field of view of the camera 52 so as to be contained in the maximum size area configuration of equal diametral dimension containable within a sectional segment, in the example shown this segment is a quadrant, of the maximum size imaginary circular area containable within the frame area of the film record upon which the image is being recorded by means of camera 52. Thus, camera 52 simultaneously photographs the plurality of images contained on the mounting means 50 to produce the desired stationary film record. It should be noted, that preferably, the individual images placed on the mounting means are preferably contained within whichever configuration complies with the desired image display area whether it be circular or rectangular configuration, whether it be circular or rectangular, and these image areas are preferably located within the field of view of the lens so as to be in the proper location on the film record frame when the photograph is made.

Figure 12:
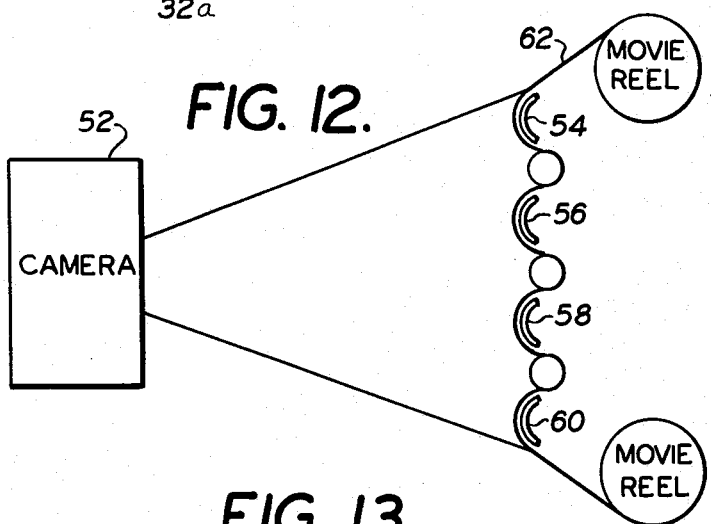
FIG. 12 is a diagrammatic illustration of an alternative method of providing the preferred stationary film record frame of the present invention.

Referring now to FIG. 12, an alternative method for producing the preferred stationary film record frame 20 of FIGS. 3 and 4 is shown. Preferably, in the method illustrated in FIG. 12, the stationary film record frame 20 is produced from a conventional movie film which contains a plurality of sequential images recorded thereon. Once again, it is assumed that the desired film record is a slide transparency and the associated camera 52 is a conventional 35 millimeter slide camera. Preferably, the movie film is threaded over a mounting means which preferably comprises a plurality of mounting surfaces 54, 56, 58 and 60, four such surfaces being shown by way of example for producing a stationary film record frame having four images. Preferably, these mounting surfaces 54 through 60, inclusive, are all located within the field of view of the lens of the camera 52 and are arrayed so as to place the images mounted on these surfaces 54 through 60, inclusive, within the proper position of the film record frame upon which the images are being recorded by camera 52, these positions being defined in the discussion of FIGS. 3 and 4. Preferably, each mounting surface 54 through 60, inclusive, only enables the mounting of one frame of the movie film 62 thereon, each movie film frame comprising an image. Preferably, every tenth frame, up to a total of four images in the example shown, is mounted on the respective mounting surfaces 54 through 60, inclusive, to provide the sequential images in the respective sequential image display areas which are preferably arrayed clockwise in sequential fashion as previously described with reference to FIGS. 3 and 4. The camera 52 then simultaneously photographs the four images contained on the mounting surfaces 54 through 60, inclusive, which have been arranged in the proper orientation to produce the stationary film record frame 20.

Figure 13:
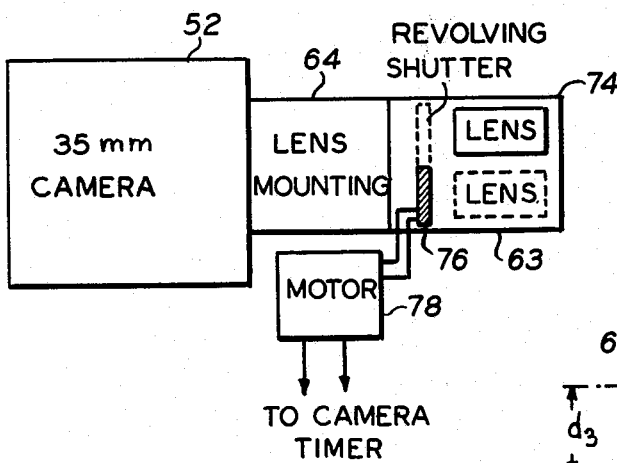
FIG. 13 is a diagrammatic illustration, partially in block of the preferred camera attachment for providing the stationary film record frame of the present invention.
Figure 14:
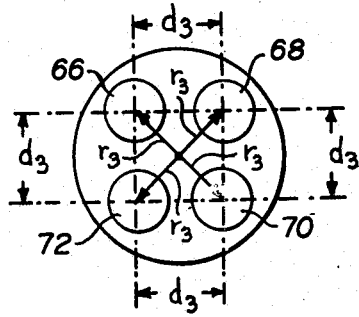
FIG. 14 is a diagrammatic illustration of the front view of the camera attachment of FIG. 13.

Referring now to FIGS. 13 and 14, another alternative method and apparatus for producing the preferred stationary film record frame 20 of the present invention is shown. Preferably, as will be described in greater detail hereinafter, the stationary film record frame may be produced by taking a photograph of a dynamic real-time event, such as a bird in flight, with a conventional 35 millimeter slide camera 52, such as a single lens reflex camera, utilizing the following described preferred attachment 63 in lieu of a conventional lens. Most conventional 35 millimeter cameras 52 have a lens mounting 64 in which any one of a number of special effect lenses may be removably mounted, such as a telephoto lense or a wide angel lens, if desired. The preferred attachment 63 preferably consists of an arrangement which is removably mountable on this conventional lens mounting 64, such as by conventional threads. As is well known, the conventional 35 millimeter camera 52 preferably includes a shutter and a timer for controlling the shutter so that a timed exposure of a picture may be made. The attachment 63 preferably includes a plurality of lenses 66, 68, 70 and 72, four such lenses being shown by way of example, which are each arranged with their respective optical axis aligned with the area of the stationary film record frame contained within the 35 millimeter camera 52 which represents the optical center of the respective associated image display area 26 through 32, or 26a through 32a, inclusive, respectively. These lenses 66 through 72, inclusive, are preferably mounted with their respective optical centers equidistant from the optical center of the lens housing 74, which center is aligned with the optical center 24 of the stationary film record frame 20 contained within the camera 52, as indicated by the notation r3, as well as being equidistant from the optical center of the adjacent lens, as indicated by the notation d3. If desired, a translation means may be provided for laterally translating these lenses as the image is focused in the manner to be described in greater detail with respect to FIGS. 1, 2, 6, 7, 8, 9, 10. As shown and preferred, a revolving shutter 76 is preferably located between the lens mounting 64 and the lens array 66 through 72, inclusive, which places this shutter 76 between the internal shutter of the camera 52 and the lens array 66 through 72, inclusive. Preferably, this revolving shutter 76 is opaque except for an aperture therein which sequentially exposes one of the lenses of the array 66 through 72, inclusive, at a time to the internal shutter of the camera 52. A conventional motor 78, such as a conventional dc motor, such as a variable speed motor, is preferably provided to drive the revolving shutter 76. This motor is preferably operatively connected to the internal camera timer of camera 52 so as to be turned on and off by this camera timer. Thus, the timing mechanism is arranged so that during the interval while the internal shutter of the camera 52 is maintained open, such as for a timed exposure, the revolving shutter 76 completes one revolution so as to sequentially expose each of the lenses 66 through 72, inclusive, to the stationary film record frame during this timed exposure. In this manner, during the timed exposure, a plurality of images equal to the number of lenses, in this instance four, is provided on the stationary film record frame, each of these images being sequential due to the time differential between the exposure of each lens over the timed exposure interval. As was previously mentioned, these lenses 66 through 72, inclusive, are preferably arranged so as to expose the desired portion of the frame record area, as previously described with reference to FIGS. 3 and 4.

Figure 1:
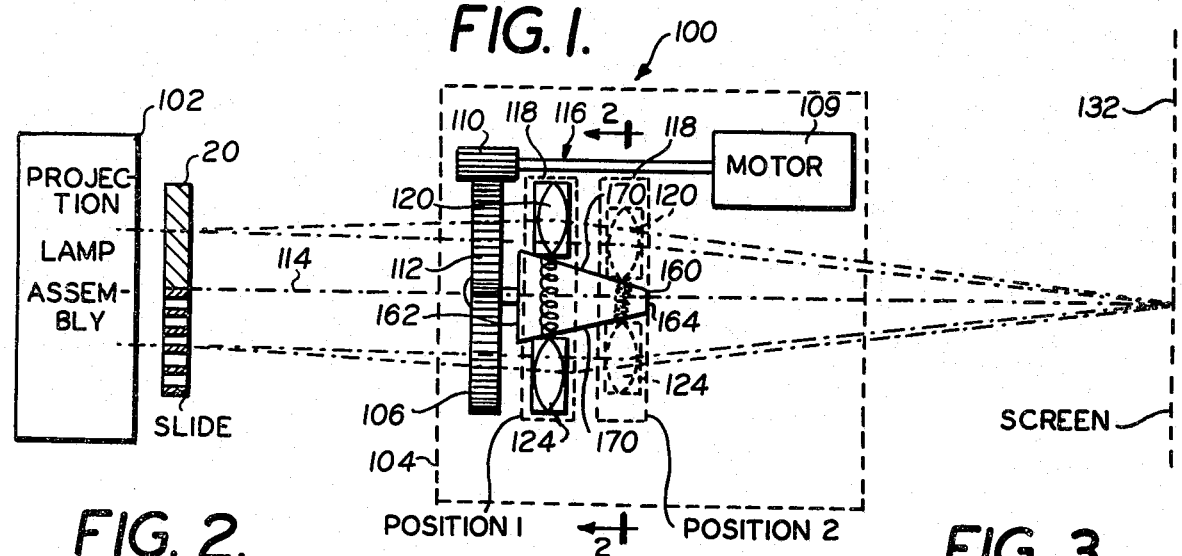
FIG. 1 is a diagrammatic illustration of the preferred display device for the preferred stationary film record frame in the present invention.

Now referring to FIGS. 1, 2, 5 and 10, the preferred projection apparatus, generally indicated by the reference numeral 100, for sequentially displaying the preferred stationary film record frame of the present invention, such as illustrated in FIGS. 3 and 4, shall be described. As was previously mentioned, for purposes of explanation, it shall be assumed that the stationary film record frame is a slide film transparency and, accordingly, the projection apparatus 100 is preferably a conventional slide film projector except for the modifications to be described in greater detail hereinafter. The projector 100, as shown in FIG. 1, preferably includes a conventional projection lamp assembly 102 and a mounting for the slide 20 to be displayed, in the example given the slide 20 being replaced by the preferred stationary film record frame 20, such as the type described with reference to FIGS. 3 and 4, for producing a sequentially displayable plurality of images from the stationary film record frame in a stationary position thereof. As shown and preferred in FIG. 1, the preferred sequential display lens-shutter apparatus 104 to be described in greater detail hereinafter, is substituted for the conventional lens assembly of the slide projector 100. If desired, this preferred assembly 104 could be an integral portion of the slide projector 100, being fixedly mounted therein in place of the conventional lens assembly, or could be a removable attachment for the slide projector 100 which replaces the conventional supplied lens assembly which is removed from the slide projector during the timing when this attachment 104 is being utilized. In such an instance, the slide projector 100 may also be utilized as a conventional slide projector to display conventional slides with the conventional lens assembly and as a sequential image projector for use with the preferred stationary film records 20 when the preferred attachment 104 replaces the conventional lens assembly.

Figure 5:
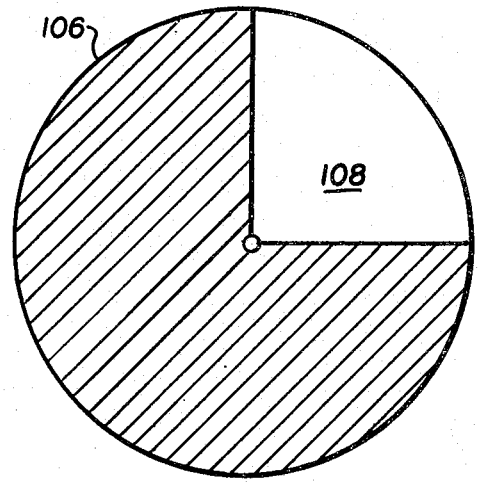
FIG. 5 is a front view of a typical shutter disc for use with the present invention.

Preferably, the preferred attachment 104 includes a revolving or rotatable shutter 106, illustrated in more detail in FIG. 5, which is preferably opaque except for a transparent aperture which corresponds to one segment of the preferred plurality of segments contained on the stationary film record frame 20. In the example shown, since the stationary film record frame contains four quadrants, this transparent area 108 preferably consists of one quadrant. The revolving shutter 106 is preferably driven by a conventional variable speed motor 109, such as a reversible variable speed dc motor, through appropriate conventional gearing 110–112, such as gear teeth 110 being located on the drive shaft of the motor 109 and gear teeth 112 being located on the periphery of the shutter 106. The revolving shutter 106 is preferably rotatably mounted on a shaft which is aligned with the longitudinal axis 114 of the projector 100, the stationary film record 20 preferably having its optical center 24 also aligned with this longitudinal axis 114.

Figure 2:
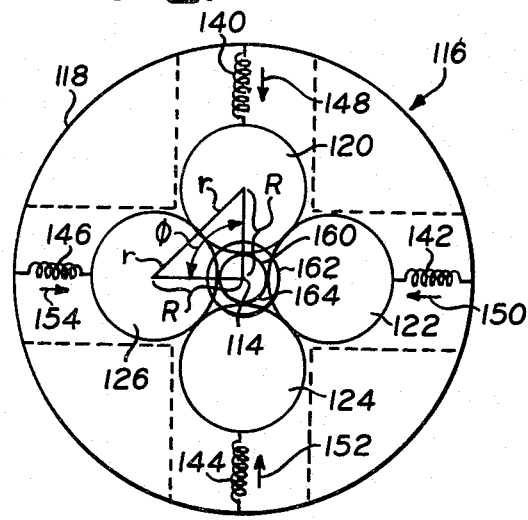
FIG. 2 is a sectional view along line 2—2 of the arrangement shown in FIG. 1.

As shown and preferred in FIGS. 1, 2, and 10, the preferred attachment 104 also preferably includes a projection lens array, generally referred to by the reference numeral 116, preferably comprising a cylindrical lens housing 118 containing a plurality of projection lenses, four such projection lenses 120, 122, 124 and 126 being shown by way of example, each lens of the plurality of projection lenses 120 through 126, inclusive, being associated with a particular one of the image display areas 26 through 32, inclusive. Each of the lenses 120 through 126, inclusive, is capable of projecting an image from its associated image display area. Preferably, the lens housing 118, and accordingly, the plurality of lenses 120 through 126, inclusive, mounted therein are movable along the longitudinal axis 114 in the directions indicated by the double arrowhead 130 in FIG. 10 so as to focus the selected images on the screen or display area 132 (FIG. 1). In addition, as will be described in greater detail hereinafter, as the lens assembly 118 is moved along the longitudinal axis 114 so as to focus the images, the associated magnification of the lenses varies in conventional fashion. Accordingly, means are also preferably provided for maintaining the registration of each of the plurality of selectively displayable images with respect to the display surface or screen 132 for a selected single image while simultaneously varying the magnification of the plurality of lenses 120 through 126, inclusive, the magnification of the lenses being varied by movement of the lens array 116 with respect to the stationary film record frame 20 along the longitudinal axes 114. As previously mentioned, longitudinal axis 114 is substantially normal to the frame area optical center 24.

As was also previously mentioned, the rotatable shutter 106 is interposable between the lens array 116 and the film record 20 and contains the aperture 108 which is preferably equal in size to one of the image display areas 26 through 32, inclusive, and is selectively registerable therewith so as to interpose an opaque mask between the lens array 116 and the other image display areas other than the one with aperture 108 is selectively registerable. Motor 109 controls the rotation of the shutter 106 so as to sequentially selectively vary the image display area with which aperture 108 is registerable so as to provide a sequential display of the images from the stationary film record 20.

As shown and preferred in FIG. 2, the lens housing 118 also preferably contains biasing means such as springs or some other resilient means, for equally biasing the lenses 120 through 126, inclusive, toward the longitudinal axis 114 with a predetermined biasing force. Preferably one such spring is associated with each of the lenses 120 through 126, inclusive, these springs being given reference numerals 140, 142, 144 and 146, respectively with the associated biasing force direction being indicated by arrows 148, 150, 152 and 154, respectively. The lenses 120 through 126, inclusive, are preferably arrayed about the longitudinal axis 114 along respective optical axes which are associated therewith which are preferably substantially parallel to the longitudinal axis 114 with each associated lens 120 through 126, inclusive, optical axis substantially intersecting the respective image display area optical center of the corresponding image display area 26 through 32, inclusive, respectively, at one predetermined limit position of magnification for the corresponding lens, the lens being maintainable in this position by the biasing springs 140 through 146, inclusive. This position is illustrated in FIGS. 1 and 2 and is labeled "position 2" in FIG. 1. At this position of the lenses, the magnification is at a predetermined minimum, such as 10, and is the position with the lenses closest to the screen and furthest from the object 20.

As also shown and preferred in FIGS. 1, 2 and 10, the preferred attachment 104 also preferably includes means for controllably overcoming the biasing force provided by the springs 140 through 146, inclusive, to simultaneously translate all of the lenses 120 through 126, inclusive, in a direction away from the longitudinal axis 114 so as to simultaneously translate the optical axes associated with the lenses 120 through 126, inclusive, to a different predetermined position substantially paralell to the longitudinal axis 114 and away from the intersection with the corresponding image display area optical centers 34 through 40, inclusive, while maintaining the stationary film record frame 20 in a stationary position so that registration of each of the selectively displayable images contained in image display areas 26 through 32, inclusive, is maintained with respect to the display surface or screen 132. As shown and preferred in FIGS. 1, 2 and 10, a conical wedge 160 having a base 162 and an apex 164 is provided with the base 162 being disposed in a direction closest to the film record frame 20 and the longitudinal axis of the wedge 160 being disposed along the longitudinal axis 114 of the projector 100. The conical wedge 160 preferably has a predetermined slope between the base 162 thereof and the apex 164 thereof corresponding to a predetermined amount of lens translation required to simultaneously maintain the registration of each of the selectively displayable images with respect to the display surface 132 while the magnification of the lenses is varied. The lenses 120 through 126, inclusive, are preferably biased by the springs 140 through 146, inclusive, against the conical wedge 160 outer surface so that the translation of the lenses determinable when they are biased against the portion of the wedge closest to the base end 162 is at another predetermined limit position of magnification for the corresponding lenses while the translation of the lenses determinanble when they are biased against the portion of the wedge closest to the apex end 164 are at the first mentioned predetermined limit position of lens magnification. These two limit positions are indicated in FIG. 1 as "position 1" and "position 2", with the maximum magnification being provided at "position 1" wherein the lenses are closest to the object 20 and furthest from the screen 132, such as a magnification of 100 at "position 1" versus a magnification of 10 at "position 2". As shown and preferred, the conical wedge 160 preferably has an associated radius about the longitudinal axis 114 which varies along the longitudinal axis 114 with the associated wedge radius at "position 2" being less than the associated wedge radius at "position 1". Each of the lenses 120 through 126, inclusive, are preferably equal in lens diameter with the lenses being adjacent to each other about the wedge 160 at "position 2", as illustrated in FIG. 2, and being spaced apart from each other at "position 1", as illustrated in FIG. 1. The slope of the wedge outer surface 170 is preferably defined by an angle of intersection $\theta$ (FIG. 10) between the outer surface 170 of the wedge against which the lenses are biased and the longitudinal axis 114. The stationary film record 20, as shown and preferred, has one predetermined distance from the lenses at "position 2" and a different distance from the lenses at "position 1", the same being true for the distance between the lenses and the display surface 132 where the image appears. The angle $\theta$ has a tangent which is preferably defined by the sum of the wedge radius at "position 2" and the radius of a single lens 120 with that sum divided by the distance between the object or slide 20 and the lens 120 in "position 2". Summarizing this discussion, assuming $u$ equals the distance of the object 20 from the lens 120, $v$ equals the distance of the image 132 from the lens 120, $f$ equals the focal length of the lens and M equals the magnification, $u$ can be calculated based on the relationship that $u$ equals $f(M+1)/M$ at both "position 1" for one magnification and "position 2" for the other magnification. The difference of these two values of u is the distance between the two extreme positions for the different limits of magnification. Then, known tangent $\theta$ and this distance between the two extreme positions, the total vertical motion of the lenses or lateral translation thereof as indicated by the arrows 180 in FIG. 10, can be calculated by multiplying tangent $\theta$ by twice the distance between the exxtremes. This total vertical motion determines the preferred maximum radius of the conical wedge. To determine the preferred minimum radius of the conical wedge 160, knowing the lens size, in the case of four lenses by way of example, it is assumed that the lenses preferably touch at "position 2". Referring now to FIG. 2, assuming the radius of each of the individual lenses is defined by the symbol $r$, the distance or radius from the longitudinal axis 114 which is congruent with the longitudinal axis of the wedge 160 and the optical center of the individual lens 120 is defined by the symbol R, and the angle between a pair of such adjacent distances R is defined by the symbol $\phi$ this distance R is equivalent to $Z r \sin \phi$, where $\phi$ equals 45° in the example shown. Accordingly, the preferred minimum wedge 160 radius is obtained by subtracting $r$ from R. This provides the preferred minimum wedge radius and the preferred maximum wedge radius required to provide the desired slope to maintain the registration of each of the selectively displayable images with respect to the display surface 132 as the magnification is varied by movement of the lens along the longitudinal axis 114. As shown and preferred, the wedge 160 is maintained stationary and the lens housing 118 is moved along the longitudinal axis, with the lenses 120 through 126, inclusive, moving up and down the slope of the wedge 160 due to this longitudinal movement and the lateral pressure applied by the biasing springs 140 through 146, inclusive. Preferably, the wedge 160 is fixedly mounted to the attachment 104 housing. Thus, as the magnification of the lens is varied, the lens is laterally displaced from the optical center of its associated image display area so as to maintain the registration of the image display area on the display surface 132, this preferably occurring simultaneously for all of the lenses and all of the associated image display areas.

Referring now to FIGS. 6 and 7, an alternative embodiment for simultaneously maintaining the registration of each of the selectively displayable images with respect to the display surface 132 while the lens magnification is varied is shown. Specifically, in place of the conical wedge 160 located along the longitudinal axis 114, a plurality of triangular wedges are provided, one such wedge preferably being provided for each of the lenses, four such wedges 200, 202, 204 and 206 being utilized in the example shown for four lenses. The slope of each of the triangular wedges 200 through 206, respectively, is preferably calculated in the same manner as discussed above with respect to the slope of the conical wedge of FIG. 1, the angle $\theta$ in this instance being defined as the angle between the hypotenuse 210 of the wedge and the base 212 (FIG. 6) of the particular wedge 200 through 206, inclusive, the slope being defined as the slope of the hypotenuse 210. Furthermore, biasing means or springs radially bias the lenses 120 through 126, inclusive, outwardly against the hypotenuse 210 surfaces of the respective associated triangular wedges 200 through 206, inclusive, these springs being given reference numerals 216, 218, 220 and 222, respectively, with their associated biasing force direction being indicated by the arrows 224, 226, 228, and 230, respectively. As in the previous discussion with reference to the conical wedge 160 illustrated in FIGS. 1, 2 and 10, the triangular wedges 200 through 206, inclusive, are oriented so that the lenses 120 through 126, inclusive, are closest together laterally, preferably touching, when they are longitudinally closest to the display surface 132 and furthest from the object 20. As shown and preferred in FIGS. 6 and 7, the biasing means or springs 216 through 222, inclusive, bias the lenses 120 through 126, inclusive, so as to maintain the lenses in a position equivalent to "position 1" of FIG. 1 which is preferably the position of maximum magnification for the lenses.

Referring now to FIGS. 8 and 9, still another alternative embodiment of a means for maintaining registration of each of the selectively displayable images with respect to the display surface 132 while the magnification of the lenses is varied due to their longitudinal movement in the direction of the longitudinal axis 114 is shown. Specifically, this arrangement comprises the use of bell crank levers physically connected to the lens housing 118 by a pivotal connection and bearing against a fixed push plate 300 so as to cause the bell crank levers to pivot about their respective pivot points. Four such bell crank levers 302, 304, 306 and 308 are shown by way of example, one bell crank lever preferably being associated with each of the four lenses 120, 122, 124 and 126, respectively. The individual lenses 120 through 126, inclusive, are preferably biased against the inner surface of the bell crank levers 302 through 308, inclusive, respectively associated therewith by biasing springs, such as springs 216, 218, 220 and 222 previously described with reference to FIG. 7. Preferably, the desired path of movement of the contact surface of bell crank levers 302 through 308, inclusive, corresponds to the slope of the conical wedge 160 previously described with reference to FIG. 1 so as to provide the same amount of lens translation required to simultaneously maintain registration of each of the selectively displayable images with respect to the display surface 132 while the magnification of the lenses is varied by longitudinal movement of the lenses in a direction along the longitudinal axis 114. Displacement of the bell crank levers 302 through 308 is preferably effectuated by pressure of the respective levers against the push plate as the lens housing 118 is longitudinally varied so as to cause the bell crank levers to pivot about their respective pivot points, such as pivot points 310 and 312 for levers 302 and 304, respectively.

By utilizing the improved method and apparatus of the present invention, a plurality of images may sequentially be displayed from a film record in a stationary position thereof so as to provide, by way of example, an animated type of projection from a stationary film record in a stationary position thereof or a sequential presentation of overlays for instructional purposes if desired. Many other usues of the stationary film records of the present invention will become readily apparent to one of ordinary skill in the art.

It is to be understood that the above described embodiments of the invention are merely illustrative of the principles thereof and that numerous modifications and embodiments of the invention may be derived within the spirit and scope thereof.

What is claimed is:

1. An attachment for a stationary film record projection means capable of sequentially displaying a plurality of sequential images stored on said stationary film record in contiguous substantially equisize image display areas which are all contained within a single frame area of said film record which is divisible into said image display areas and has an associated initial optical center for purposes of said display, with each of said image display areas having a different distinct associated initial optical center for purposes of said display which are each equidistant from said frame area initial optical center, said sequentially displayable images each having substantially the same orientation with respect to each other and said frame area optical center; said attachment comprising a projection lens array having a plurality of projection lenses, each of said projection lenses of said plurality being aligned with a different corresponding image display area, said plurality of lenses being equal in number to said plurality of image display areas, each of said lenses being capable of projecting a image from said associated image display area; a controllably rotatable shutter means interposable between said lens array and said film record, said shutter means having an aperture therein substantially equal in size to one of said image display areas and being selectively registerable therewith, said shutter means further being capable of interposing an opaque mask between said lens array and said other image display areas for selectively preventing the display of said image display areas other than the one with which said aperture is selectively registerable; and means for controllably rotating said shutter means for sequentially selectively varying the image display area with which said aperture is registerable so as to provide said sequential display of said images from said stationary record; said lens array further comprising means for simultaneously varying the magnification of said plurality of lenses and maintaining the registration of each of the plurality of selectively displayable images with respect to a display surface for said selected single image, said lens array having a longitudinal axis, with said magnification being varied by movement of said lens array with respect to said stationary film record frame along said longitudinal axis, said longitudinal axis being substantially normal to said frame area optical center, said magnification varying and registration maintaining means comprising means for substantially equally biasing said lenses in a direction relative to said longitudinal axis with a predetermined biasing force, said lenses being arranged about said longitudinal axis along optical axes associated therewith which are substantially parallel to said longitudinal axis, said lens optical axis substantially intersecting the image display area optical center of the corresponding image display area at a predetermined position of magnification for the corresponding lens and being maintainable in at least said position and variable therefrom to vary said magnification to another maintainable position thereof, whereby a plurality of sequential images may sequentially be displayed from said film record frame in a stationary position thereof.

2. An attachment in accordance with claim 1 wherein said lenses biasing means comprises means for equally biasing said lenses in a direction toward said longitudinal axis with a predetermined biasing force, said lens optical axis substantially intersecting the image display area optical center of the corresponding image display area at one predetermined limit position of magnification for the corresponding lens and being maintainable in said position by said biasing means.

3. An attachment in accordance with claim 2 wherein said magnification varying and registration maintaining means further comprises means for controllably overcoming said biasing force for simultaneously translating said lenses in a direction away from said longitudinal axis so as to simultaneously translate said optical axes associated with said lenses to a different predetermined position substantially parallel to said longitudinal axis and away from said intersection with the corresponding image display area optical center while maintaining said stationary film record frame in a stationary position, whereby said registration of each of said selectively displayable images with respect to said display surface is maintained.

4. An attachment in accordance with claim 3 wherein said biasing force overcoming means comprises a conical wedge having a base and an apex and a longitudinal axis with said lenses disposed about said conical wedge and with said base disposed in the direction of said film record frame optical center, said conical wedge having a predetermined slope between the base thereof and the apex thereof corresponding to a predetermined amount of said lens translation required to simultaneously maintain said registration while said magnification is varied, said lenses being biased against said conical wedge, the translation of said lenses determinable when biased against said base end of said wedge being at another predetermined limit position of magnification for said corresponding lenses while the translation of said lenses determinable when biased against said apex end of said wedge being at said one predetermined limit position of said lens magnification.

5. An attachment in accordance with claim 4 wherein said one predetermined limit position of said lens magnification is a minimum selected magnification for said lens and said other predetermined limit position is a maximum selected magnification for said lens, said conical wedge having an associated radius about said longitudinal axis which varies along said longitudinal axis, said associated wedge radius varies along said longitudinal axis, said associated wedge radius at said one predetermined limit position being less than said associated wedge radius at said other predetermined limit position, said lenses each having an associated lens diameter, said diameters being equal, said lenses being adjacent each other about said wedge at said one predetermined limit position, said wedge slope being defined by an angle of intersection between an outer surface of said wedge against which said lenses are biased and said longitudinal axis, said stationary film record having a first distance from said lens at said one predetermined limit position and a second distance from said lens at said other predetermined limit position, said angle having a tangent defined by the sum of the wedge radius of said lens with said sum divided by said first distance.

6. An attachment in accordance with claim 4 wherein said lens array is biased radially with respect to said longitudinal axis, by said wedge as said lens array moves along said longitudinal axis to vary said magnification while said wedge is stationary with respect to said stationary film record.

7. An attachment in accordance with claim 1 wherein said lenses biasing means comprises means for equally biasing said lenses in a direction away from said longitudinal axis with a predetermined biasing force, said lens optical axis substantially intersecting the image display area optical center of the corresponding image display area at one predetermined limit position of magnification for the corresponding lens and being biased towards another predetermined limit position of magnification for the corresponding lens by said biasing means.

8. An attachment in accordance with claim 7 wherein said magnification varying and registration maintaining means further comprises means for controllably overcoming said biasing force for simultaneously translating said lenses in a direction toward said longitudinal axis so as to simultaneously translate said optical axes associated with said lenses from their position at said other predetermined position toward a different position at said one predetermined limit position with said optical axes being substantially parallel to said longitudinal axis and with said stationary film record frame in a stationary position, whereby said registration of each of said selectively displayable images with respect to said display surface is maintained.

9. An attachment in accordance with claim 8 wherein said biasing force overcoming means comprises an inclined surface area with respect to said longitudinal axis against which inclined surface area said lenses are biased by said biasing means, said inclined surface area having a predetermined slope corresponding to a predetermined amount of said lens translation required to simultaneously maintain said registration while said magnification is varied.

10. An attachment in accordance with claim 8 wherein said biasing force overcoming means comprises a bell crank means against which said lenses are biased by said biasing means, said bell crank means having a predetermined path of movement corresponding to a predetermined amount of said lens translation required to simultaneously maintain said registration while said magnification is varied.

11. An attachment in accordance with claim 3 wherein said biasing force overcoming means comprises a bell crank means against which said lenses are biased by said biasing means, said bell crank means having a predetermined path of movement corresponding to a predetermined amount of said lens translation required to simultaneously maintain said registration while said magnification is varied.

12. In a stationary film record projection means for projecting an image stored on a stationary film record on to a display surface, the improvement comprising means capable of sequentially displaying a plurality of sequential images stored on said stationary film record in contiguous substantially equisize image display areas which are all contained within a single frame area of said film record which is divisible into said image display areas and has an associated initial optical center for purposes of said display, with each of said image display areas having a different distinct associated initial optical center for purposes of said display which are each equidistant from said frame area initial optical center, said sequentially displayable images each having substantially the same orientation with respect to each other and said frame area optical center; said means capable of sequentially displaying a plurality of sequential images stored on said stationary film record comprising a projection lens array having a plurality of projection lenses, each of said projection lenses of said plurality being aligned with a different corresponding image display area, said plurality of lenses being equal in number to said plurality of image display areas, each of said lenses being capable of projecting an image from said associated image display area; a controllably rotatable shutter means interposable between said lens array and said film record, said shutter means having an aperture therein substantially equal in size to one of said image display areas and being selectively registerable therewith, said shutter means further being capable of interposing an opaque mask between said lens array and said other image display areas for selectively preventing the display of said image display areas other than the one with which said aperture is selectively registerable; and means for controllably rotating said shutter means for sequentially selectively varying the image display area with which said aperture is registerable so as to provide said sequential display of said images from said stationary record; said lens array further comprising means for simultaneously varying the magnification of said plurality of lenses and maintaining the registration of each of the plurality of selectively displayable images with respect to a display surface for said selected single image, said lens array having a longitudinal axis with said magnification being varied by movement of said lens array with respect to said stationary film record frame along said longitudinal axis, said longitudinal axis being substantially normal to said frame area optical center, said magnification varying and registration maintaining means comprising means for substantially equally biasing said lenses in a direction relative to said longitudinal axis with a predetermined biasing force, said lenses being arrayed about said longitudinal axis along optical axes associated therewith which are substantially parallel to said longitudinal axis, said lens optical axis substantially intersecting the image display area optical center of the corresponding image display area at a predetermined position of magnification for the corresponding lens and being maintainable in at least said position and variable therefrom to vary said magnification to another maintainable position thereof, whereby a plurality of sequential images may sequentially be displayed from said film record frame in a stationary position thereof.

13. A projection means in accordance with claim 12 wherein said lenses biasing means comprises means for equally biasing said lenses in a direction toward said longitudinal axis with a predetermined biasing force, said lens optical axis substantially intersecting the image display area optical center of the corresponding image display area at one predetermined limit position of magnification for the corresponding lens and being maintainable in said position by said biasing means.

14. A projection means in accordance with claim 13 wherein said magnification varying and registration maintaining means further comprises means for controllably overcoming said biasing force for simultaneously translating said lenses in a direction away from said longitudinal axis so as to simultaneously translate said optical axes associated with said lenses to a different predetermined position substantially parallel to said longitudinal axis and away from said intersection with the corresponding image display area optical center while maintaining said stationary film record frame in a stationary position, whereby said registration of each of said selectively displayable images with respect to said display surface is maintained.

15. A projection means in accordance with claim 14 wherein said biasing force overcoming means comprises a conical wedge having a base and an apex and a longitudinal axis disposable along said lens array longitudinal axis with said lenses disposed about said conical wedge and with said apex disposed in the direction of said film record frame optical center, said conical wedge having a predetermined slope between the base thereof and the apex thereof corresponding to a predetermined amount of said lens translation required to simultaneously maintain said registration while said magnification is varied, said lenses being biased against said conical wedge, the translation of said lenses determinable when biased against said base end of said wedge being at another predetermined limit position of magnification for said corresponding lenses while the translation of said lenses determinable when biased against said apex end of said wedge being at said one predetermined limit position of said lens magnification.

16. A projection means in accordance with claim 15 wherein said one predetermined limit position of said lens magnification is a minimum selected magnification for said lens and said other predetermined limit position is a maximum selected magnification for said lens, said conical wedge having an associated radius about said longitudinal axis which varies along said longitudinal axis, said associated wedge radius at said one predetermined limit position being less than said associated wedge radius at said other predetermined limit position said lenses each having an associated lens diameter, said diameter being equal, said lenses being adjacent each other about said wedge at said one predetermined limit position and spaced apart from each other as said other predetermined limit position, said wedge slope being defined by an angle of intersection between an outer surface of said wedge against which said lenses are biased and said longitudinal axis, said stationary film record having a first distance from said lens at said one predetermined limit position, said angle having a tangent defined by the sum of the wedge radius at said one predetermined limit position and the radius of said lens with said sum divided by said first distance.

17. A projection means in accordance with claim 15 wherein said lens array is biased radially with respect to said longitudinal axis by said wedge as said lens array moves along said longitudinal axis to vary said magnification while said wedge is stationary with respect to said stationary film record.

* * * * *